United States Patent
Ramos Costa et al.

(10) Patent No.: US 10,936,865 B2
(45) Date of Patent: Mar. 2, 2021

(54) DEVICE AND METHOD FOR IDENTIFYING A CORK STOPPER, AND RESPECTIVE KIT

(71) Applicant: INEGI-INSTITUTO DE ENGENHARIA MECANICA E GESTAO INDUSTRIAL, Oporto (PT)

(72) Inventors: Valter Joaquim Ramos Costa, Vila Nova de Gaia (PT); Armando Jorge Miranda De Sousa, S. Mamede Infesta (PT); Ana Rosanete Lourenco Reis, Povoa de Varzim (PT); Dirk Gerard Celina Robert Loyens, Matosinhos (PT)

(73) Assignee: INEGI-INSTITUTO DE ENGENHARIA MECANICA E GESTAO INDUSTRIAL, Oporto (PT)

( * ) Notice: Subject to any disclaimer, the term of this patent is extended or adjusted under 35 U.S.C. 154(b) by 64 days.

(21) Appl. No.: 16/345,407

(22) PCT Filed: Oct. 30, 2017

(86) PCT No.: PCT/IB2017/056734
§ 371 (c)(1),
(2) Date: Apr. 26, 2019

(87) PCT Pub. No.: WO2018/078600
PCT Pub. Date: May 3, 2018

(65) Prior Publication Data
US 2019/0251348 A1    Aug. 15, 2019

(30) Foreign Application Priority Data
Oct. 28, 2016 (PT) .......................... 109709

(51) Int. Cl.
| | | |
|---|---|---|
| *G06K 9/00* | (2006.01) | |
| *G06K 9/20* | (2006.01) | |
| *G06K 9/62* | (2006.01) | |

(52) U.S. Cl.
CPC ....... *G06K 9/00577* (2013.01); *G06K 9/2027* (2013.01); *G06K 9/2036* (2013.01); *G06K 9/6202* (2013.01)

(58) Field of Classification Search
CPC ............. G06K 9/00577; G06K 9/2036; G06K 9/6202; G06K 9/2027
See application file for complete search history.

(56) References Cited

U.S. PATENT DOCUMENTS

2016/0299061 A1* 10/2016 Goldring .................. G01J 3/10

FOREIGN PATENT DOCUMENTS

| WO | WO2009/053756 | 4/2009 | |
|---|---|---|---|
| WO | WO 2016/077934 | 5/2016 | |
| WO | WO 2016077934 A1 * | 5/2016 | ............. G01N 21/84 |

OTHER PUBLICATIONS

Moreno et al, "Designing light-emitting diode arrays for uniform near-field irradiance", Applied Optics, 2006 (Year: 2006).*

(Continued)

*Primary Examiner* — Ruiping Li
(74) *Attorney, Agent, or Firm* — Leason Ellis LLP

(57) ABSTRACT

Method for identifying a cork stopper comprising: capturing an image of a surface of the cork stopper which is being illuminated tangentially to said surface; comparing the captured image to a database of previously stored images of cork stoppers; indicating whether the captured image matches one of the previously stored images of cork stoppers. It is also disclosed a device for identifying a cork stopper comprising an electronic data processor arranged to carry out said method. A kit comprises said device and an illuminator arranged for illuminating tangentially (grazing (Continued)

light) a surface of the cork stopper. The kit and the method can be used to easily identify cork stopper and bottle together thus making counterfeiting much harder.

16 Claims, 5 Drawing Sheets

(56) References Cited

OTHER PUBLICATIONS

Ivan Moreno et al: "Designing light-emitting diode arrays for uniform near-field irradiance", Applied Optics, Optical Society of America, Washington, DC; US, vol. 45, No. 10, Apr. 1, 2006 (Apr. 1, 2006) pp. 2265-2272, XP002671230, ISSN: 0003-6935, DOI: 10.1364/A0.45.002265 the whole document.

* cited by examiner

DEVICE AND METHOD FOR IDENTIFYING A CORK STOPPER, AND RESPECTIVE KIT

CROSS-REFERENCE TO RELATED PATENT APPLICATIONS

This application is a U.S. National Phase Application under 35 U.S.C. § 371 of International Patent Application No. PCT/IB2017/056734, filed Oct. 30, 2017, which claims the priority of Portuguese Application No. 109709, filed Oct. 28, 2016, which is incorporated by reference as if expressly set forth in its entirety herein.

TECHNICAL FIELD

The present disclosure relates to a cork stopper identification device and method, for identifying pre-observed cork stoppers.

BACKGROUND

Identifying and authenticating wine bottles has important advantages namely: product authentication; anti-counterfeiting; anti-tampering; traceability; among others. Existing devices or methods for identifying and authenticating wine, liquor or spirits bottles are based on added devices, have shortcomings and are overly complex and costly.

The anti-counterfeiting market currently proposes using a transparent polymer having a completely random pattern of generated bubbles (BUBBLE TAG™) and a reference printed on a label or a tag, to be added to a container. Blisters appear in positions, shapes and sizes which do not build an array from the generated pattern. Consequently, each generation of bubbles is unique and impossible to replicate even by subsequent bubble generations. The method comprises obtaining an image with a pattern with corresponding bubbles which is assigned an individual human-readable code; storing the image and corresponding code in a database; for counterfeiting testing the user should enter the code to retrieve an image and compare with the real image at hand.

It has also been proposed using a random optical dispersion of particles, Ramdot™. During production the particles are dispersed in a random fashion creating aggregates which are unique. The particles are produced with different colours. This technique also uses the visual comparison of images to validate the authenticity of the product.

It has also been proposed using a set of random lines (fibres) on a printed label, FIBERTAG™. This technique also uses the visual comparison of images to validate the authenticity of the product.

In any of the above prior art solutions, the authentication/validation of the product is made by the user and the system depends on the quality of the random dispersion of bubbles/particles/fibres present in the manufacturing process. Furthermore, the prior art solutions require very specific and costly materials and/or marking processes that are added (frequently as a label) to the outside of a beverage container, not part of the product.

An authentic stopper is a stopper that has been previously registered in a database by the bottled beverage producer. Furthermore, in the present context, an authentic bottle is a bottle with a stopper that has been previously registered in said database by the bottled beverage producer. In the present context, a counterfeit bottle or stopper is a bottle or stopper that is not authentic.

These facts are disclosed in order to illustrate the technical problem addressed by the present disclosure.

GENERAL DESCRIPTION

The present disclosure takes advantage of cork itself for authentication and furthering tamper-proof characteristics of a product. Cork is a natural material which, among other applications, is applied to the manufacture of caps for glass bottles (cork-stopper). It has been observed that the cork surface of a cork stopper has random cracks (channels), lines and discolorations forming a very intricate, unique pattern. A digital identification method based on an imaging process for recognition of these unique patterns is possible in a stopper, even if inside a non-opaque container such as a glass bottle.

To the purpose of this disclosure, authenticating a non-opaque (transparent or partially transparent) beverage container with a natural cork stopper may be done by initial storage of the combined image of the assembly (container+stopper) and later automatic comparison of the combined image of another assembly to be tested. Most of the information normally comes from the natural cork stopper, which contributes with more features to the unique pattern. Thus, the presence the natural cork stopper may be used to identify an assembly of container and stopper, whether using a combined image of the assembly (container+stopper) or using just the image of the stopper.

This has advantages namely that the identification method is not dependent on the manufacturing process; validation/authentication can be done automatically; authentication is not dependent on an external "tag" (or label) of the bottle or the stopper. The present disclosure also does not require specific or costly materials neither any marking processes, thus not being dependent on a specific manufacturing process.

A method for identifying a cork stopper is disclosed, i.e. for identifying an individual cork stopper, comprising:
 capturing an image of a surface of the cork stopper which is being illuminated tangentially to said surface of the cork-stopper;
 comparing the captured image to a database of previously stored images of cork stoppers;
 indicating whether the captured image matches one of the previously stored images of cork stoppers.

One of the advantages of the disclosure is that it requires no interference with the assembly or contained products enclosed by said cork stopper, except lighting.

In an embodiment, the method comprises the step of pre-illuminating tangentially said surface of the cork-stopper.

In an embodiment, said surface is a top surface of the cork stopper.

In an embodiment, the top surface of the cork stopper is being illuminated tangentially and around its periphery towards the cork stopper.

In an embodiment, said surface is a side surface of the cork stopper.

In an embodiment, the cork stopper is the closure of a non-opaque container, most particularly a beverage bottle, in particular the cap of a wine (including sparkling and fortified wines), liquors or spirits bottle.

In an embodiment, the side surface of the cork stopper is being illuminated tangentially from the top, bottom or side of the bottle through glass (or the material of the non-opaque container); the image of the cork stopper is captured through glass of the bottle (or the material of the non-opaque container).

In an embodiment, both the captured image, and the database of previously stored images of cork stoppers, comprise captured glass imperfections of the respective beverage bottle.

In an embodiment, the cork stopper is a natural cork stopper, i.e. a cork, or an agglomerated cork stopper.

In an embodiment, the comparison between the captured image and the database of previously stored images of cork stoppers comprises comparing relief features between the captured image and the database of previously stored images of cork stoppers, in particular comparing by hashing or intermediate calculated variables or other helper data.

It is also disclosed a non-transitory storage media including program instructions for implementing a method for identifying a cork stopper, the program instructions including instructions executable to carry out any of the disclosed methods.

It is also disclosed a device for identifying a cork stopper comprising the non-transitory storage media of the previous claim, an electronic camera, an electronic user interface and an electronic data processor arranged to execute said program instructions.

In an embodiment, said device is a handheld device with lens, an electronic camera, or a smartphone equipped with a camera.

It is also disclosed a kit for identifying a cork stopper comprising the disclosed device and an illuminator ring arranged for illuminating towards the centre of said ring.

In an embodiment, said illuminator ring is arranged for illuminating tangentially with grazing light, from the periphery and towards the centre of a surface of a cork stopper.

In an embodiment, said illuminator ring is provided with an optical lens, typically a macro lens, for assisting the camera in capturing said image.

It is also disclosed a kit for identifying a cork stopper, comprising the disclosed device and an illuminator arranged for illuminating the top, bottom or side at the neck of a bottle. The mentioned light is conducted through the glass of the bottle for illuminating tangentially a side surface of the cork stopper.

In an embodiment, said illuminator is arranged for illuminating tangentially a side surface of a cork stopper, through glass of the bottle and from the top or the bottom of the bottle, wherein said bottle comprises said cork stopper as closure.

BRIEF DESCRIPTION OF THE DRAWINGS

The following figures provide preferred embodiments for illustrating the description and should not be seen as limiting the scope of invention.

DETAILED DESCRIPTION

Figure 1:
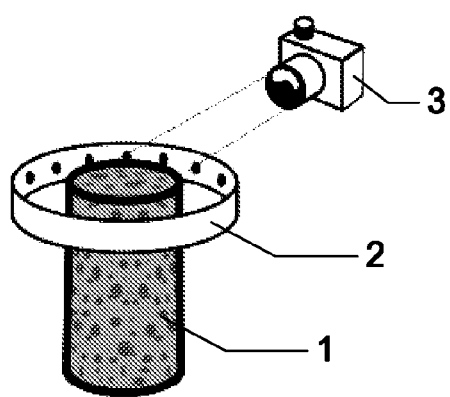
FIG. 1: Schematic representation of an embodiment of image capture with tangent lighting to the top surface of a cork stopper.

An embodiment of the disclosure comprises the user taking a picture of the cork stopper in a bottle, for example using an application, and the photo being sent to a server that contains a photo database of stoppers. The sent data (photo and/or helper data) is processed and compared to the existing database and the result of this comparison is returned to the application. The helper data may be used to expedite database search. At this point, the user will then know if this cork stopper/bottle assembly was recognized and as such if it is an authentic or counterfeit product, or whether it may be necessary to take another picture for ensuring a more exact response.

The image acquisition seeks to take advantage of the fact that cork is a natural product. It has been found that cork stoppers, by their very nature always present a unique set of colouring patterns and reliefs (three-dimensional elevations) comprising a set of cracks and lenticular channels and other natural markings that allow recognizing each individual cork stopper.

In the most unlikely event of an image from an assembly (cork plus bottle) having the same image features of another assembly already present in the database, additional processing is needed on the comparison (or totally discarding the most recent assembly). in order to distinguish the two images. Improved image comparison can be done by working with an enlarged set of features from both images. Furthermore, the fact that this recognition is done by emphasizing the three-dimensional aspects of the cork stopper to be recognized by grazing (i.e. tangent to the surface) lighting, this thus enhances features which make the system very difficult to reproduce by potential counterfeiters.

The disclosure also has the advantage that common consumer grade hardware can be used, rather limited local processing is required the photo to ensure quality of the photo, simple hashing information can be sent in order to make the database search faster, and special lenses are not necessary.

The acquisition of the photo can be made using consumer equipment such as a camera of a smartphone or a webcam and using a consumer grade lens, suitable for the purpose of the disclosure (example: macro lens).

The illumination can be made in two different ways of grazing (tangent to a surface) light. In case the area of interest is the top of the stopper, the illumination is done by using a ring of LEDs. The second form of lighting is used in case the area of interest is through the side glass. In this case, the lighting is made with a light on the top or the bottom of the glass bottle. Grazing lighting of the cork stopper is designed to graze the reliefs of the surface of interest of the stopper and enhance image quality.

The LED lighting may be comprised by, for example, 6 LEDs (each of 16-22 lumens) arranged around a ring, arranged for projecting light grazing (i.e. at a shallow angle, tangent) the top surface of the cork stopper.

The bottle works as a light guide in the top or bottom lighting embodiment, conducting light into a grazing arrangement in the side of the cork stopper. The bottle bottom lighting can be obtained by using a spot reflector lamp of for example 75W or 1500 lumens.

It is to be noted that if the glass contains imperfections (seams, bubbles, etc), in the bottom lighting embodiment, these will be input and used as if they were part of the cork stopper pattern, thus authenticating the set of cork plus bottle—this is considered equal or better in terms of authentication because either a change of cork stopper or bottle will be detectable. Thus, glass and cork imperfections are welcome and contribute to a unique pattern. Glass and cork imperfection can even be intentionally added or promoted. Additionally, the cork does not age significantly and does not move inside the bottle, thus a stable image is expected over time. Scratches and other small "features" that may appear on the outside of the container bottle can cause noise and limited occlusion but do not prevent recognition of the many initial, high contrast features.

One of the possible recognition methods is based on the calculation and matching the key features between two pictures, one taken by the customer equipment and the other stored in a central database. Not taking into consideration communications details, the main steps are thus for example:

0. After production and bottling, for every bottle, a picture of the assembly of the bottle with the cork stopper is stored in the database;
1. User takes a picture of a cork-stopper;
2. Calculate the key features of this picture and evaluate initial quality of the picture; if quality insufficient, inform the user and abort;
3. Calculate or retrieve the key features of a picture previously stored in the database; compare the user image with the image on the database for instance with feature matching methods such as SIFT, SURF, ORB, BRIEF, BRISK, etc.; iterate all pictures in the database, possibly using hashing and or additional data for optimization;
4. Alongside, perform relevant authenticity tests—for example to distinguish a printed pattern (low contrast, etc) from a real three dimensional image;
5. Return authenticity and information related to the found assembly to the user.

The present disclosure is valid for natural cork stoppers and also for agglomerated cork stoppers, both types of displaying the aforementioned individually unique relief comprising a set of cracks, channels and markings that provide a unique identifier of each cork stopper.

The matching method can be the same for the side lighting embodiment (analysing the top surface of the stopper) or for the top/bottom/side illumination of the embodiment (analysing the lateral surface of the stopper) as the features/pattern to be detected are very similar, only requiring a small adaptation to take into account the overall image shape (likely to be roughly circular for analysis of the top surface of the stopper and almost any other shape for the lateral view (examples: circular or rectangular).

The disclosure has been found to be fairly immune to colour temperature ('whiteness') of the light or even light colour, as the features to be detected are mostly relief features, thus detectable by intensity/luminance analysis. White light seems to work fine in most cases but lighting colour issues may arise from container light absorbance at given light wavelengths (a simple example would be to use green lighting for a green wine bottle; this illumination would use less energy). The disclosed method does not exclude other methods of illumination including non-visible wavelengths for illumination such as near-UV or near-IR.

Preferably, the lighting should provide high contrast for obtaining high resolution repeatable, sharp and trust worthy images that improve accuracy and thus make the system harder to circumvent. The grazing lighting system should be preferably strong enough to provide images of high contrast of the three dimensional features but also preferably uniform so that no illumination shadows are wrongly classified as cork features.

FIG. 1 shows a schematic representation of an embodiment of image capture with tangent lighting to the top surface of a cork stopper 1. The camera 3 is roughly coaxial with the cylindrical cork stopper 1 so that the image taken is of the top cut of the cork. The light is emitted by a plurality of light emitters 2 (for example, LEDs) arranged around a ring and pointing towards its inner space in order to emit light tangent to the top surface of the cork stopper and providing shallow angle uniform illumination of the full area of the top of the cork.

Figure 2:
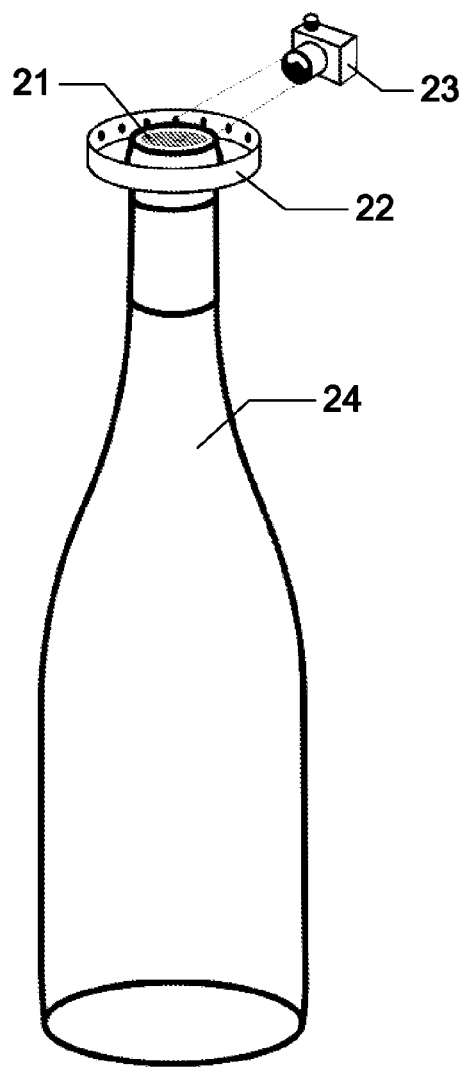
FIG. 2: Schematic representation of an embodiment of image capture with tangent lighting to the top surface of the cork stopper in a bottle.

FIG. 2 shows a schematic representation of the kit for identification of cork stoppers; this embodiment of the disclosed provides image capture with tangent lighting to the top surface of the cork stopper 21 in a bottle 24. The camera 23 and ring 22 are as explained for FIG. 1.

Figure 3:
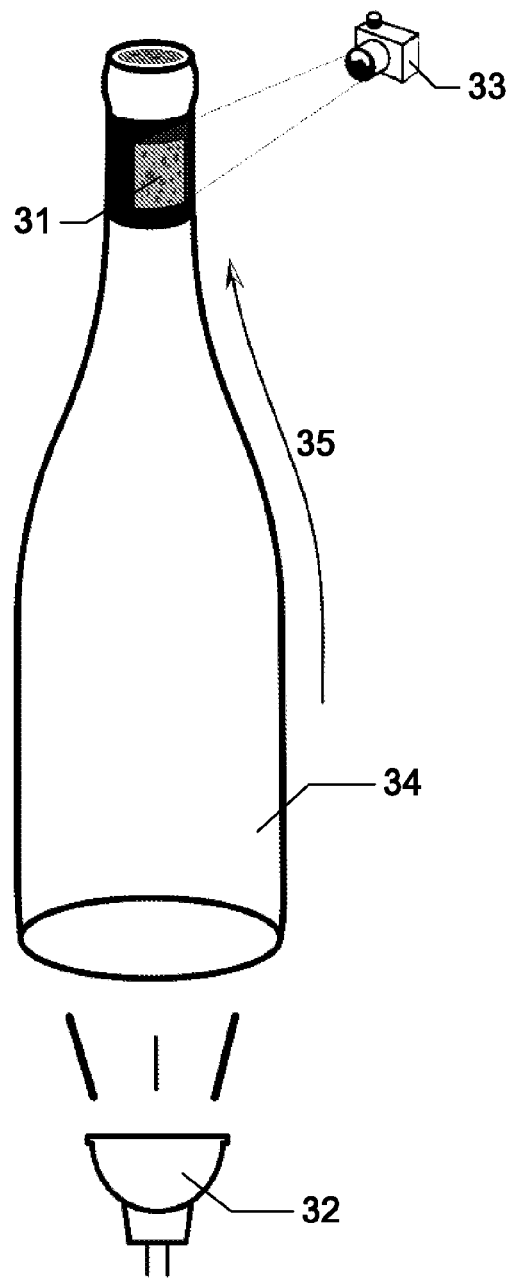
FIG. 3: Schematic representation of an embodiment of image capture in a bottle with tangent (grazing) light conducted through the bottle glass to the side surface of the cork stopper.

FIG. 3 shows a schematic representation for another possible embodiment of the kit for identification of cork stoppers here disclosed. Camera 33 captures side of cork 31 with tangent lighting produced by 32 (example LEDs). This light is conducted 35 through the bottle glass to produce grazing lighting to the side surface of the cork stopper 31. The camera 33 is to be placed roughly parallel to the lateral of the cork stopper 31, to get a clear, mostly undistorted view of the cork surface seen through the glass bottle 34. Non-opaque container materials such as glass and plastics are generally light conducting and thus light conduction 35 is easy although some light loss is to be expected (related to opacity of the material, distances and angles of the path of the light).

In both kits, large amounts of light make photography on hand held devices easier, independent of room light, provide higher contrast images thus contributing to the correct working of the overall setup.

The following presents results (shown in table I) from tests establishing the identification capabilities of the cork stopper relief for the bottom lighting embodiment (analysing the lateral surface of the stopper) using the proposed kit. All the cork stoppers were captured into a database and then subsequently tested against said database. The disclosed method provides a correct answer 99.2% of the times. It can be seen how the disclosed method gives a very low (in this case zero) false positives count, meaning that no counterfeit stoppers are identified as genuine nor are they identified as another. There is a very small number of false negatives (i.e. genuine stoppers not identified) which has a much smaller impact because the user can try again with a better picture, algorithms can be improved/adapted or the authenticity can be double-checked using a secondary method (for example a prior art method as mentioned above).

TABLE I

| True positive | False positive |
|---|---|
| 48 | 0 |
| False negative | True negative |
| 10 | 1218 |

Another experiment involved testing printed images of known cork stoppers in the database ("replicas"). Cork stopper replicas were mostly similar to the human naked eye when seen through bottle; they were produced by photographing and printing known corks and printed sheet inserted into the bottle as if to fool a user. Three types of replicas were tried, black & white LASER printed; colour LASER printed and inkjet colour printed. A number of adjustments were tried and a total of 18 replicas produced. It was verified that the disclosed method always distinguishes between the obtained genuine cork stopper images from the images of the replicas. Thus it is not possible to circumvent the disclosed authentication method by providing replicas to the kit.

Another test involved verifying images of cork stoppers placed in a first bottle, removed from said bottle, and finally inserted onto a second bottle. It was verified that the disclosed method distinguishes between the obtained cork stopper images from the first bottle and the obtained cork stopper images from the second bottle.

Figure 4A:
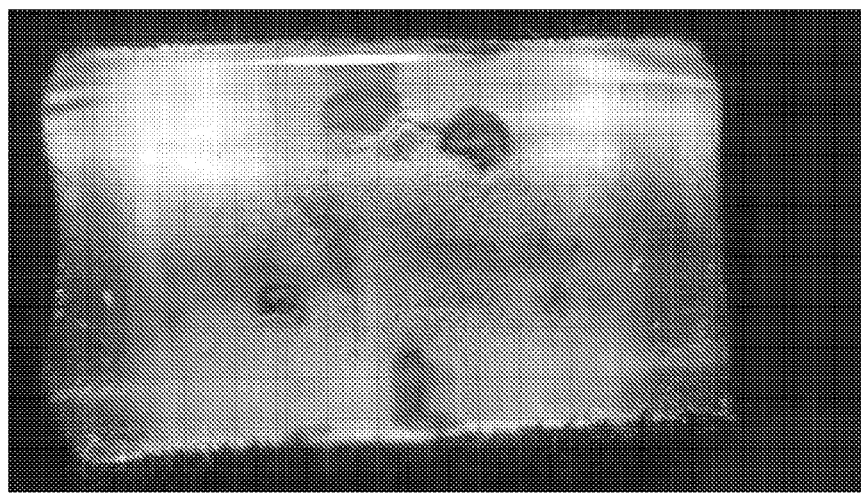
FIG. 4: Photographic representation of an image captured of the same cork stopper in two different bottles, wherein the captured image of the cork surface relief differs as the cork stopper is moved to a different bottle.
Figure 4B:
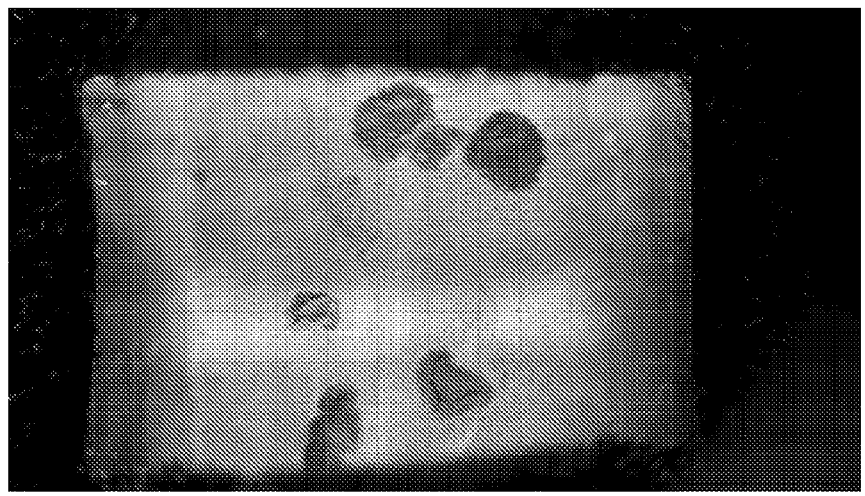

FIG. 4 shows a photographic representation of an image captured of the lateral side of the same cork stopper in two different bottles, wherein the captured image of the cork surface relief differs as the cork stopper is moved to a different bottle. Thus it is not possible to circumvent the disclosed authentication method by reusing authentic cork stoppers in counterfeit bottles, as the side image capture by the kit is different enough.

Another test involved verifying images of cork stoppers placed in a bottle, removed from said bottle, and finally re-inserted onto the same bottle. It was verified that the disclosed method distinguishes between the first obtained cork stopper images from the bottle and the second obtained cork stopper images from the bottle.

In both cases—cork in the same or in another bottle—retrieved images are different and contributing to such differences are glass imperfections, glass seams, bubbles, cork degradation by recompression, glass/cork detail positioning and grease stains that change adhesion from the cork to the glass bottle. Some of these issues may be intentionally promoted if deemed interesting.

Such considerations may be extended to other stoppers and containers where the mentioned considerations remain valid.

If using the top view of the cork and the image of the reused top of the cork was to remain completely unaltered, which is very difficult, the counterfeiting would not be detected. Reusing with careful repositioning to produce the same exact image is an expensive counterfeiting strategy, limited in time because recompressing cork stopper will eventually alter cork and its appearance.

Thus it is almost impossible to circumvent the disclosed authentication method by re-closing a bottle after removing its beverage contents and replacing with a different content.

The following results (shown in table II) regard analysing the top cork stopper surface, also showing a very low (in this case zero) false positives count, meaning that no counterfeit stoppers are identified as genuine nor are they identified as another. There is a very small number of false negatives (i.e. genuine stoppers not identified), a situation that has less impact than a false positive. In the case of a false negative, the same method can be used once more with a better picture or the authenticity can be verified using a secondary method (for example a prior art method as mentioned above).

TABLE II

| True positive | False positive |
|---|---|
| 136 | 0 |
| False negative | True negative |
| 23 | 13038 |

The following results shown in Table III are for tests with agglomerated cork stoppers. Although the number of tested corks was smaller, it can be easily seen that the disclosed authentication method is equally powerful in distinguishing the cork stoppers.

TABLE III

| True positive | False positive |
|---|---|
| 20 | 0 |
| False negative | True negative |
| 0 | 180 |

Figure 5:
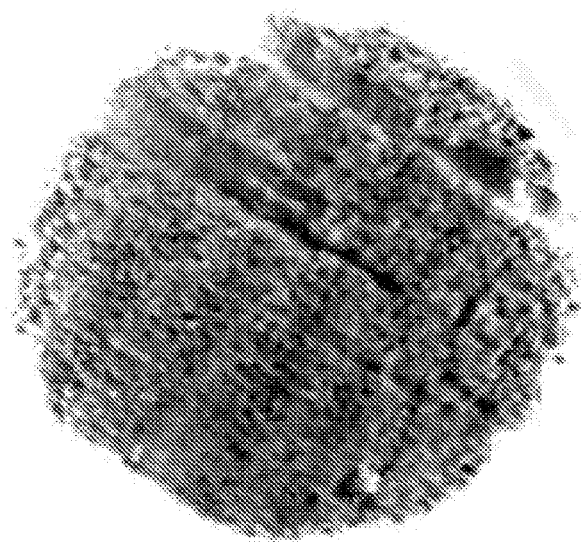
FIG. 5: Photographic representation of an image captured of the top surface of a cork stopper where the relief features are visible by virtue of the tangent lighting.

FIG. 5 shows a photographic representation of an image captured of the top surface of a cork stopper where the relief features are visible by virtue of the tangent (grazing) light.

Figure 6:
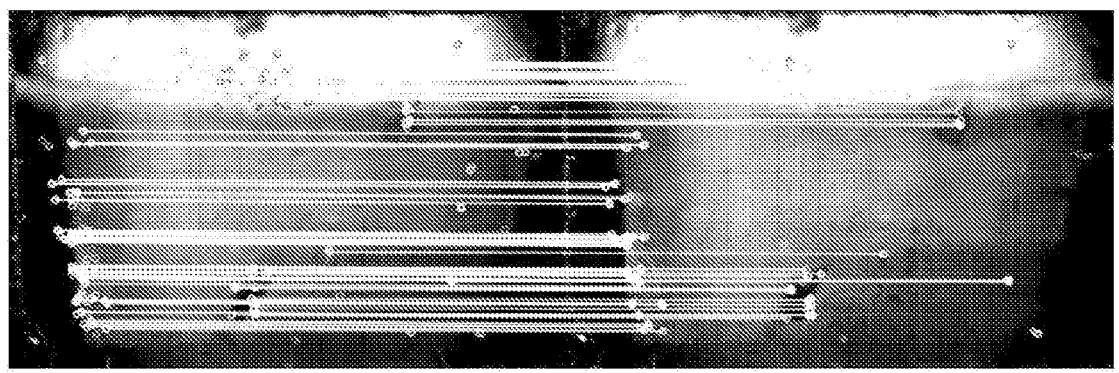
FIG. 6: Photographic representation of a positive feature matching between a captured image from a cork stopper being analysed and an image stored in a database of previously registered cork stoppers.

FIG. 6 shows a photographic representation of a positive feature matching between a captured image from a cork stopper being analysed and an image stored in a database of previously registered cork stoppers.

Figure 7:
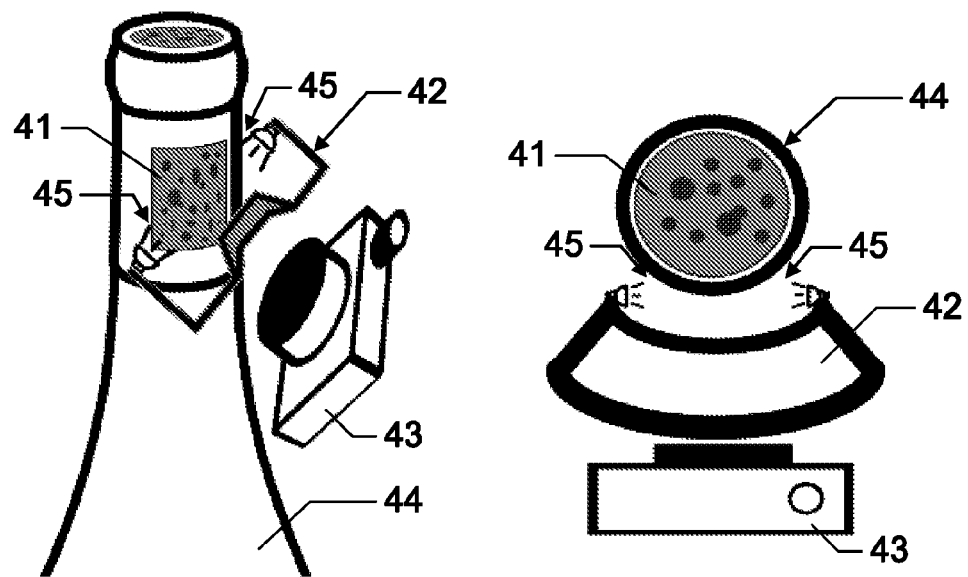
FIG. 7: Schematic representation of an embodiment with tangent (grazing) light to the side surface of a bottleneck with a mechanical kit comprising lens and tangential illumination.

FIG. 7 shows a schematic representation for another possible embodiment of the kit for identification of cork stoppers here disclosed by illuminating laterally at the bottle neck with light tangent to the cork surface. Camera 43 captures the cork side surface 41 with tangent lighting produced by 42 (for example with LEDs). Produced light should be mostly tangent to the outside of the bottle. This light is locally arranged to be conducted 45 near to the region of interest in order to produce tangent (grazing) lighting to the side surface of the cork stopper 41. The camera 43 is preferably to be placed roughly parallel to the lateral of the cork stopper 41, to get a clear, mostly undistorted view of the cork surface seen through the glass bottle 41. Non-opaque container materials such as glass and plastics are generally light conducting and thus light conduction 45 is easily done and light loss is reduced due to shorter light path.

The setup shown in FIG. 7 shows a reduced size setup comprising illumination and an optional lens which is interesting because the count of separate parts is reduced and flexibility is increased. This setup is thus more practical and compact.

The term "comprising" whenever used in this document is intended to indicate the presence of stated features, integers, steps, components, but not to preclude the presence or addition of one or more other features, integers, steps, components or groups thereof.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

It is to be appreciated that certain embodiments of the disclosure as described herein may be incorporated as code (e.g., a software algorithm or program) residing in firmware and/or on computer useable medium having control logic for enabling execution on a computer system having a computer processor, such as any of the servers described herein. Such a computer system typically includes memory storage configured to provide output from execution of the code which configures a processor in accordance with the execution. The code can be arranged as firmware or software, and can be organized as a set of modules, including the various modules and algorithms described herein, such as discrete code modules, function calls, procedure calls or objects in an object-oriented programming environment including in a distributed manner, using communications systems. If implemented using modules, the code can comprise a single module or a plurality of modules that operate in cooperation with one another to configure the machine in which it is executed to perform the associated functions, as described herein.

The disclosure should not be seen in any way restricted to the embodiments described and a person with ordinary skill in the art will foresee many possibilities to modifications thereof.

The above described embodiments are combinable. The following claims further set out particular embodiments of the disclosure.

The invention claimed is:

1. A method for identifying a cork stopper comprising:
   capturing an image of a surface of the cork stopper which is being illuminated tangentially by grazing light to said surface; and
   comparing the captured image to a database of previously stored images of cork stoppers;
   indicating whether the captured image matches one of the previously stored images of cork stoppers.

2. The method according to claim 1 wherein the surface is a top surface of the cork stopper.

3. The method according to claim 2 wherein the top surface of the cork stopper is being illuminated by grazing light tangentially and around its periphery towards the cork stopper.

4. The method according to claim 1 wherein the surface is a side surface of the cork stopper.

5. The method according to claim 1 wherein the cork stopper is a closure of a beverage bottle selected from the group consisting of a wine bottle, a liquor bottle and a spirits bottle.

6. The method according to claim 5 wherein the surface is a side surface of the cork stopper that is illuminated tangentially by grazing light conducted inside glass of the bottle and the captured image is captured through the glass of the bottle.

7. The method according to claim 5 wherein the bottle is illuminated at the top, at the bottom or laterally at a neck such that grazing light is conducted inside glass of the bottle for illuminating tangentially a side surface of the bottle by grazing light.

8. The method according to claim 5 wherein both the captured image and the database of previously stored images of cork stoppers, comprise captured image material imperfections of the respective beverage bottle, in particular glass imperfections.

9. The method according to claim 1 wherein the cork stopper is one of a natural cork stopper and an agglomerated cork stopper.

10. The method according to claim 1 wherein the comparison between the captured image and the database of previously stored images of cork stoppers comprises comparing relief features between the captured image and the database of previously stored images of cork stoppers, in particular comparing by hashing or intermediate calculated variables.

11. A device for identifying a cork stopper comprising; a non-transitory storage media that includes program instructions for implementing a method for identifying a cork stopper, the program instructions including instructions executable to carry out the method of claim 1; an electronic user interface and a data processing module arranged to execute said program instructions, wherein the device is selected from the group consisting of a camera-equipped smartphone, a camera-equipped handheld device and a handheld camera.

12. A kit for identifying a cork stopper comprising the device of claim 11 and an illuminator ring arranged for illuminating towards a centre of said ring, wherein said illuminator ring is arranged for illuminating tangentially by grazing light, from the periphery and towards the centre of a surface of the cork stopper.

13. The kit of claim 11 for identifying a cork stopper comprising the device of the claim 11 and an illuminator arranged for illuminating a bottle such that light is conducted through the glass of the bottle for illuminating tangentially a side surface of the cork stopper by grazing light, wherein said bottle comprises said cork stopper as closure.

14. The kit according to claim 13 wherein the illuminator comprises an electronic camera optical lens.

15. A method for identifying a cork stopper comprising:
   capturing an image of a surface of the cork stopper which is being illuminated tangentially by grazing light to said surface; and
   comparing the captured image to a database of previously stored images of cork stoppers;
   indicating whether the captured image matches one of the previously stored images of cork stoppers;
   wherein the comparison between the captured image and the database of previously stored images of cork stoppers comprises comparing relief features of the surface of the cork stopper between the captured image and the database of previously stored images of cork stoppers.

16. The method of claim 15, wherein the step of illuminating the cork stopper comprises the step of positioning a light source proximate to a neck of a bottle containing the cork stopper, the light source having an arcuate shaped body with a first light at a first end and a second light at an opposite second end, the first and second lights illuminating lateral at the bottle neck with light being tangent to the cork stopper.

* * * * *